United States Patent [19]

Iijima

[11] Patent Number: 5,044,000
[45] Date of Patent: Aug. 27, 1991

[54] DRIVING METHOD OF SOLID-STATE IMAGING DEVICE FOR IMPROVING SMEAR PHENOMENON

[75] Inventor: Takashi Iijima, Tokyo, Japan

[73] Assignee: NEC Corporation, Japan

[21] Appl. No.: 387,030

[22] Filed: Jul. 27, 1989

[30] Foreign Application Priority Data

Jul. 27, 1988 [JP] Japan ................................. 63-188728

[51] Int. Cl.⁵ ...................... G11C 19/28; H01L 29/78; H04N 3/14
[52] U.S. Cl. ........................................ 377/60; 357/24; 358/213.19
[58] Field of Search ...................... 357/24; 377/57–63; 358/213.19

[56] References Cited

U.S. PATENT DOCUMENTS

| | | | |
|---|---|---|---|
| 4,498,013 | 2/1985 | Kuroda et al. | 357/24 LR |
| 4,672,455 | 6/1987 | Miyatake et al. | 358/213.19 |
| 4,717,945 | 1/1988 | Yusa et al. | 357/24 LR |
| 4,851,890 | 7/1989 | Miyatke et al. | 357/24 LR |

Primary Examiner—Gene M. Munson
Attorney, Agent, or Firm—Laff, Whitesel, Conte & Saret

[57] ABSTRACT

An imaging area has a substrate with a mosaic of photo diodes arranged in rows and columns on a solid state substrate. Vertical shift registers are positioned between the columns to transfer photo charges out of the photo diodes and to associated electronic circuits. Depletion layers are interposed in said substrate to separate it into areas. Pulses are applied to the depletion layers driving the transfer periods in order to prevent charge overflow, and therefore a smearing of the image.

4 Claims, 4 Drawing Sheets

DRIVING METHOD OF SOLID-STATE IMAGING DEVICE FOR IMPROVING SMEAR PHENOMENON

BACKGROUND OF THE INVENTION

1. Field of the Invention

The present invention relates to a driving method of a CCD imaging device of a frame interline transfer type (hereinafter called an "FIT type"), and especially to a driving method of a solid-state imaging device for reducing the occurrence of a smear.

2. Description of the Related Art

Considerable improvement has been made with regard to a smear phenomenon which is a fault peculiar to the solid-state imaging device. Such improvement is remarkable in a so-called FIT-type CCD imaging device which is shown in FIG. 1. An imaging area 27 has a plurality of columns of photo-diodes 21 and a plurality of vertical CCD shift register 22, each of which is placed adjacent to each column of photo-diodes 21. A charge storage area 28 consists of a plurality of CCD charge transfer stages. A horizontal CCD shift register 25 shifts charges to an output portion 26, the charges having been transferred from the respective photo-diodes 21 through the vertical CCD shift registers 22 and the charge storage area 28. Charges that do not get shifted by the vertical CCD shift registers 22 to the storage area 28 end up in a charge drain portion 24.

An FIT-type CCD imaging device having a vertical overflow drain produces less smear than the amount found in an interline (IL) type CCD imaging device by increasing the frequency of frame transfer (FT). This reduces the smear to such a level as to enable the use of the imaging device as a broadcasting camera, although the use of the FIT-type device is accompanied by an enlarged chip area.

This FIT-type CCD imaging device enables the application of an electronic shutter mode. A conventional driving method will be described in regard to a normal mode and the shutter mode by using FIG. 1 and FIGS. 2(a) and 2(b).

In the normal mode, the solid-state imaging device shown in FIG. 1 is driven at a timing shown in FIG. 2(a). Specifically, a photoelectric conversion is made in a photo-diode 21 within a signal output period 12 in a one field period 11. A signal charge accumulated therein is read out to a vertical CCD shift register (hereinafter called a "V-CCD") 22 of an imaging area 27 by a read-out pulse 15. This charge is transferred subsequently to V-CCD 23 of the charge storage area 28 by a high-speed normal transfer pulse 16 and thereafter read out of a chip through a horizontal CCD shift register (hereinafter called "H-CCD") 25 and an output portion 26.

In the shutter mode, the signal charge in the photo-diode 21 is read out to V-CCD 22 by the read-out pulse 15 before a shutter accumulation period 14 is started, and this charge is swept out to the drain portion 24 by a high-speed sweep pulse 17 within a blanking period 13. Meanwhile, the photodiode 21 starts to accumulate the signal charge again with a commencement of the shutter period. The charge thus accumulated is read out of the chip by the same operation as in the normal mode. Since the time of the commencement of the shutter accumulation period 14 can be set arbitrarily in the shutter mode, a period wherein the photo-diode 21 accumulates the signal charge can be selected arbitrarily. According to this system, it is possible to control the amount of exposure and to prevent the blurring of an image of a subject moving at high speed.

The prior-art FIT-type CCD imaging device is faulty in that conspicuous deterioration in the smear occurs at the time of shuttering, though the smear at the time of an ordinary photosensing operation is reduced sufficiently.

The cause of this deterioration will be described with reference to FIGS. 3 and 4. The imaging device has a vertical overflow structure comprising the imaging area 27 (FIG. 1), the storage area 28, the H-CCD 25 and the drain portion 24 which are formed in a P-well region 41 at the surface portion of an N-type substrate 40, as shown in FIG. 3. The smear occurs when light ① falling obliquely on a photo-diode 21 reflects off the surface thereof and further reflects off a photoshield 44 and enters V-CCD 22 of the imaging area 27 (see FIG. 1), or when a charge generated in the depth of the photodiode 21 (when light ② falls thereon) is diffused into V-CCD 22 beyond a transfer gate 42, as shown in FIG. 3. The quantities of light ① and ② increase when a subject to be sensed is of high luminance.

In the FIT-type CCD imaging device, the smear is caused by charges leaking in at the time of a high-speed sweeping transfer high-speed normal transfer, or in a period between these transfers, the length of this period being the same both in the normal mode and in the shutter mode. Accordingly, the smear in the shutter mode is more pronounced in comparison with that in the normal mode as shown in FIG. 4. A signal amount in the shutter mode increases as indicated by line 55 while a signal amount in the normal mode increases as indicated by line 53 in this FIG. 4. A smear in the shutter mode, denoted by line 57, is equal to the smear in the normal mode in terms of the accumulation time and is higher in terms of the amount of smear per unit time. Therefore the smear in the shutter mode becomes larger than the smear in the normal mode, denoted by line 56.

In the case when a subject 61 of high luminance is present in the shutter mode, as shown in FIG. 5(a), a smear 62 occurs consequently above and below the subject 61. When the smear is swept out to a drain 24 (see FIG. 1) by a high-speed sweep pulse, a part of the smear caused by the subject 61 of high luminance is not swept out and remains in V-CCD 22. The part of V-CCD 22 wherein this smear is held receives the smear due to the subject 61 of high luminance, again during high-speed transfer. Therefore, the smear tends to occur in the lower-side image of the subject of high luminance even when it does not occur both above and below the subject 61. It happens to occur only in the lower part of the subject 61 of high luminance, as shown in FIG. 5(b).

SUMMARY OF THE INVENTION

The object of the present invention is to present a driving method of a solid-state imaging device which prevents the occurrence of the smear phenomenon without other undesirable phenomenon, such as a blur in a reproduced picture of moving subject.

The other object of the present invention is to present a driving method of a solid-state imaging device for reducing the occurrence of the smear phenomenon which is effective for any type of solid-state imaging device having a vertical overflow drain structure.

According to the present invention, a driving method of a solid-state imaging device has a vertical overflow drain structure. The driving method applies a pulse which increases the reverse bias of the PN junction formed in the substrate for forming the vertical overflow drain structure to the substrate in a period, at least, while a signal charge is being transferred from a vertical CCD shift register. Especially, in driving the frame interlace transfer (FIT)-type CCD imaging device, the pulse deepening the reverse bias is applied in a period, at least, while the signal charge is being transferred from the imaging area to the charge storage area through the vertical CCD shift registers in both areas.

The present invention effectively prevents the smear phenomenon from occurring as follows: charges generated by the incident light ②  (see FIG. 3) under the photo-diodes can be absorbed by widening a depletion layer between the n-type substrate and the p-type vertical overflow drain layer. In practice, the smear is reduced to 70% by increasing the potential of the substrate from 8 V to 15 V, as shown in FIG. 7.

BRIEF DESCRIPTION OF THE DRAWINGS

The above and other objects, features and advantages of the present invention will become more apparent from the following description of the preferred embodiments taken in conjunction with the accompanying drawings, wherein.

DETAILED DESCRIPTION OF THE PREFERRED EMBODIMENTS

Next, a description will be made of the inventive method, with reference to the drawings showing the equipment in which the inventive method is used.

Figure 1:
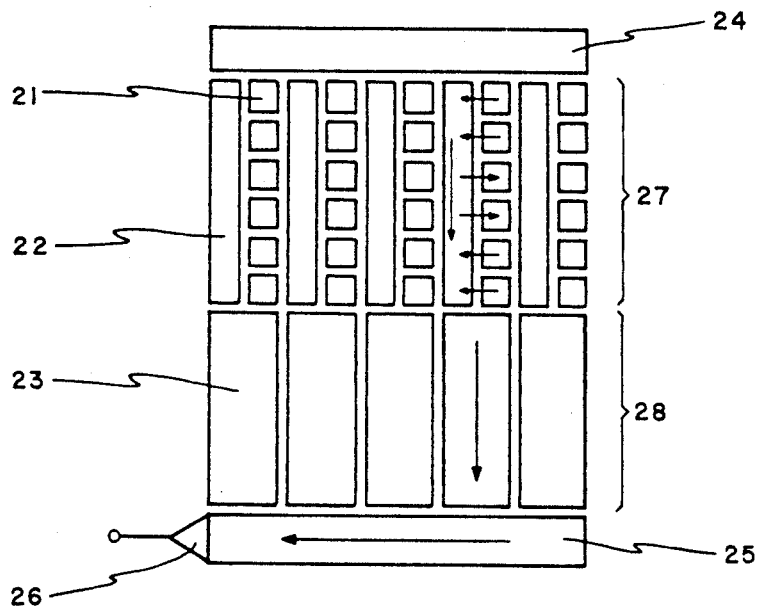
FIG. 1 is a plan view of a prior art FIT-type CCD imaging device which use the first preferred embodiment of the inventive method.
Figure 5A:
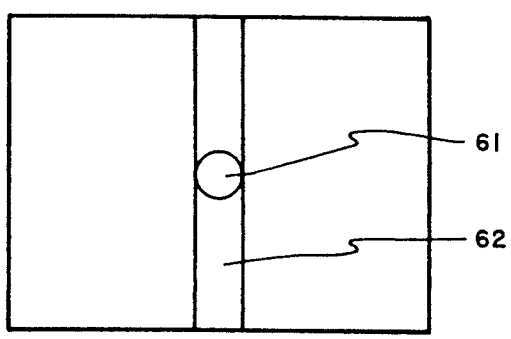
FIGS. 5(a) and 5(b) are drawings of reproduced pictures affected by the smear phenomenon.
Figure 4:
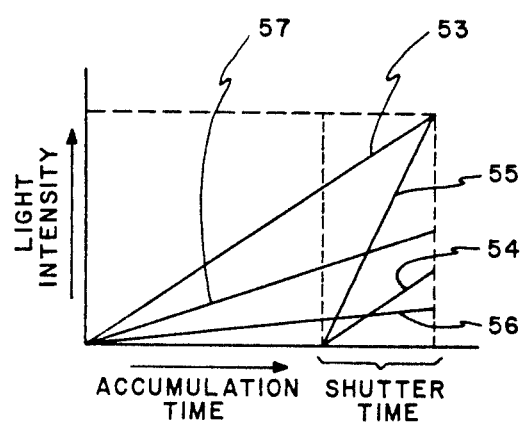
FIG. 4 is a graph showing values of signal charge and smear charge which is useful for explaining the prior art and the embodiments of the present invention.
Figure 7:
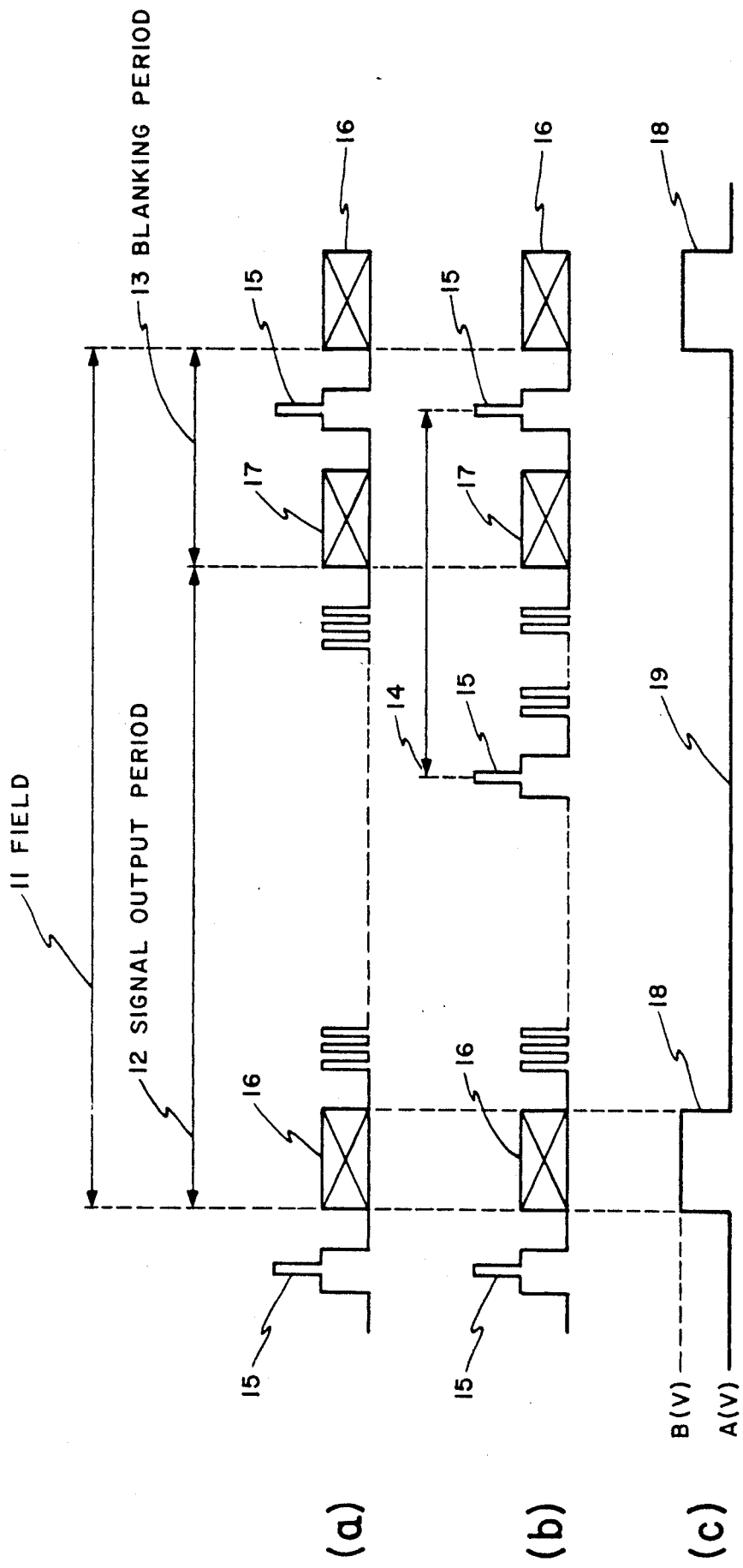
FIGS. 7(a) to 7(c) are timing charts showing driving pulses and a substrate bias voltage for explaining the first preferred embodiment of the present invention.
Figure 2A:
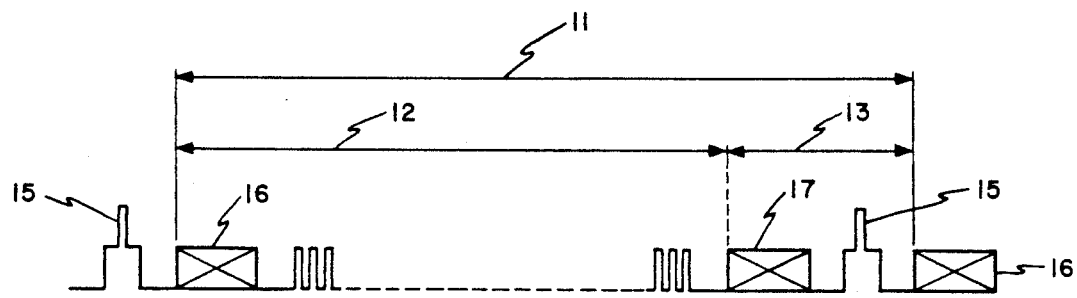
FIGS. 2(a) and 2(b) are timing charts showing driving pulses for explaining a prior driving method of a CCD imaging device.
Figure 2B:
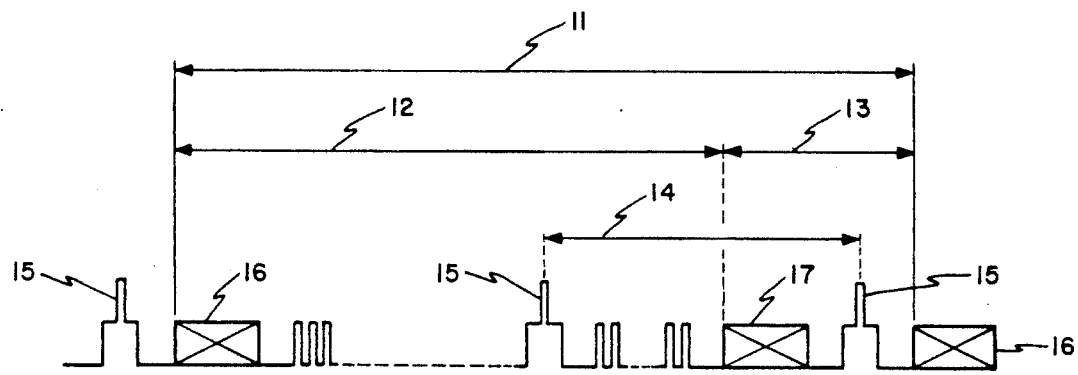
Figure 6:
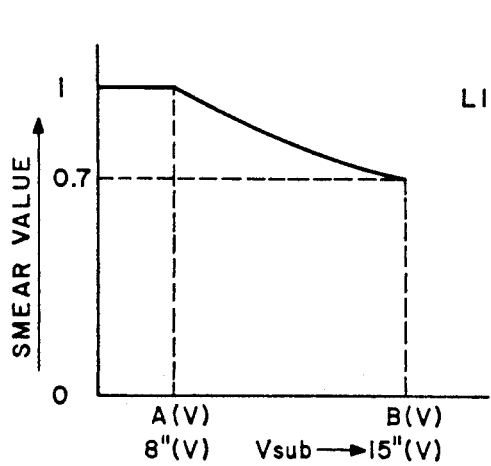
FIG. 6 is a graph showing a relationship between the value of smear charge and the substrate bias.
Figure 3:
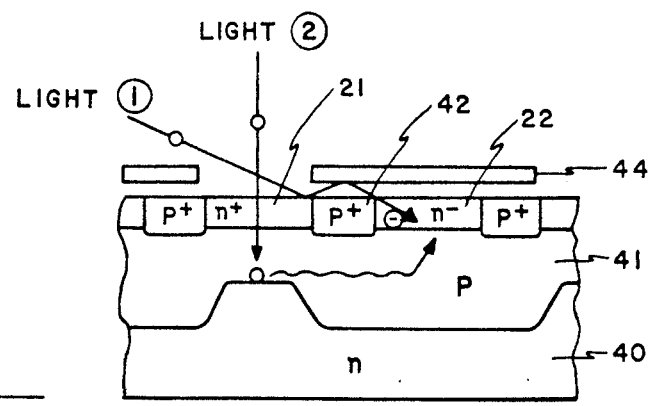
FIG. 3 is a sectional diagram of a prior art CCD imaging device having a vertical overflow drain structure which uses the inventive method.

An imaging device employing in a first preferred embodiment of the inventive method is shown in FIGS. 1 and 3. FIGS. 7(a) and 7(b) are timing charts of drive pulses used in the first inventive method, and FIG. 7(c) shows a substrate bias potential. FIG. 7(a) shows a drive pulse in the normal mode, and FIG. 7(b) is a vertical transfer pulse in the high-speed shutter mode having a shutter accumulation time 14. The descriptions of these cases is omitted, since they are identical with those in the prior-art example shown in FIGS. 2(a) and 2(b).

In the FIT structure having a substrate 40 held at 8 volts, the leak-in charge in the period of a high-speed normal transfer pulse 16 turns out to be the smear. Therefore it is necessary to suppress the smear occurring in this period. Accordingly, a pulse 18 of 15 volts is applied to the substrate 40 as shown in FIG. 7(c), over the period of the high-speed normal transfer pulse 16, to widen the depletion layer between the P-well layer 41 and the N-type substrate 40. Thus, the charge generated in the P-well layer 41 under the photo-diode 21 is drawn into the substrate 40, so as to suppress the occurrence of the smear. As a result, the smear on the reproduced picture is decreased by 30%.

Figure 8:
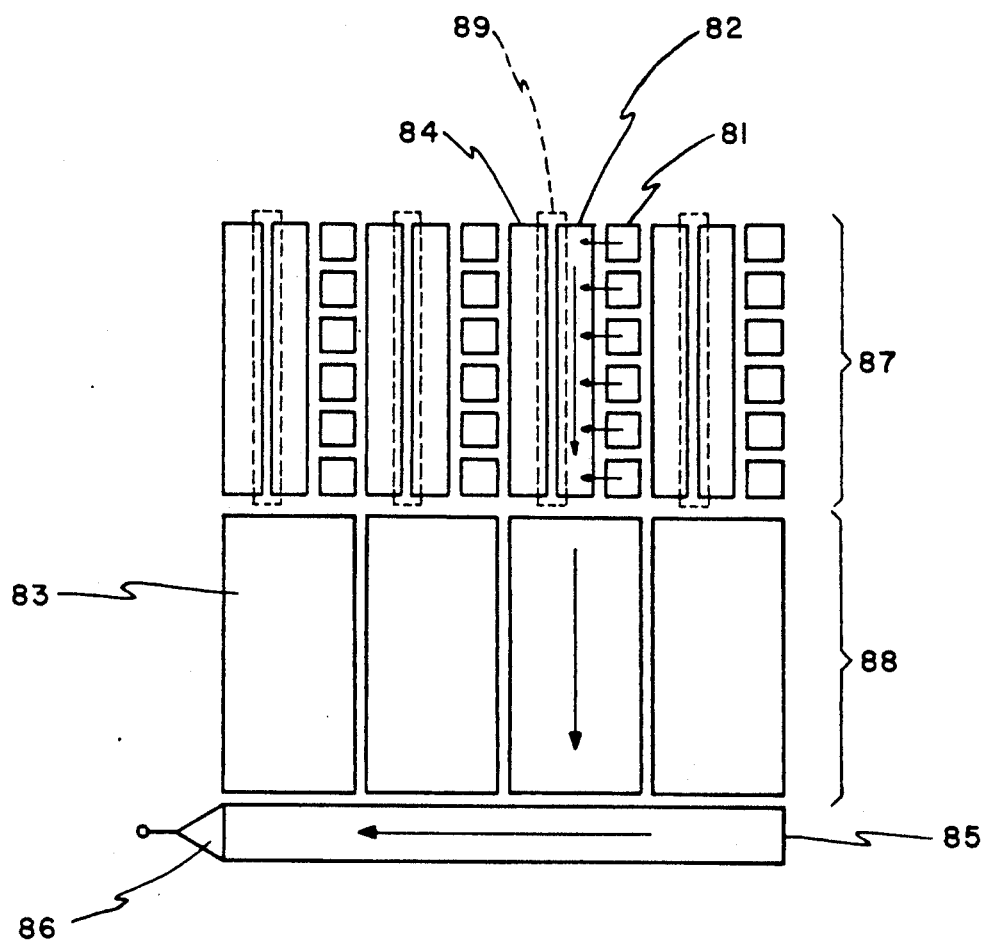
FIG. 8 is a plan view of a CCD imaging device used in a second preferred embodiment of the present invention.

A device as shown in FIG. 8, wherein an overflow portion 84 is provided on the lateral side of V-CCD 82 of the imaging device in addition to the vertical overflow drain structure, will be described in connection with a second embodiment of the inventive method. In this drawing, numerals having least significant digits which are common to the numerals of FIG. 1 denote parts which are equivalent to the parts of FIG. 1.

Figure 5B:
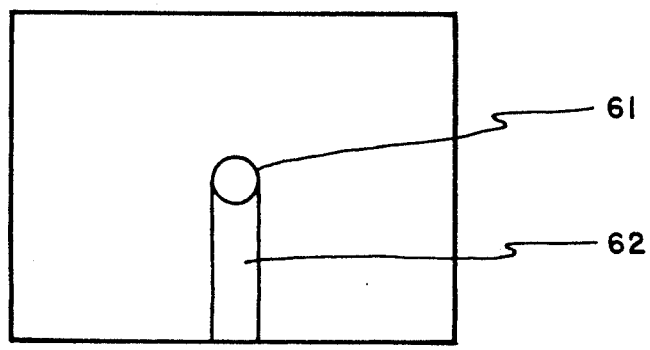

The smear generated in the high speed normal transfer period can be swept out regularly by this drain part 84. Therefore the sweep-out of the smear by means of transfer is unnecessary. The effect from the smear generated in other periods still remains. The inventive driving method in this case differs from the method in the first embodiment that is used in connection with FIG. 1. In the second embodiment, a sweep pulse is applied to a gate 89, instead of the charge being swept out by using the high-speed sweep pulse 17 as in the embodiment of FIG. 7. It (the second inventive method) is the same as the first inventive method, in other respects. That is, the bias voltage to the substrate is increased from 8 volts to 15 volts at a time when charges are transferred to the charge storage area 88 from the V-CCD 82 to decrease the effect of the remaining smear. According to the second inventive driving method, the accumulation of the smear charge at the time of the application of the high-speed sweep pulse is eliminated, and the phenomenon of the smear being doubled is also eliminated. The present embodiment (the second method), therefore, mitigates the tendency of the smear occurring on the lower side of a reproduced image as shown in FIG. 5(b), which is the case with the first method. The effect of the reduction of the smear is further increased by stopping the application of the sweep pulse on the gate 89 just before a charge of a photodiode 81 is read out to V-CCD 82 in the blanking period.

Although the pulse is applied to the substrate only when the high-speed normal transfer pulse is applied, in each of the above-described embodiments, the pulse may be applied further on the substrate within the blanking period as well.

What is claimed is:

1. A method of driving a solid-state imaging device formed in a semiconductor substrate and having an imaging area with a plurality of lines of photo-sensitive elements, a charge storage areas for temporarily storing charges accumulated in and transferred from said imaging area, means for transferring said charges accumulated in said imaging area to said charge storage area, said transferring means operating as a first vertical CCD shift register for transferring said charges and said charge storage area operating as a second vertical CCD shift register for transferring charges therein, a horizontal CCD shift register coupled to receive charges in parallel from said charge storage area and to output said charges in serial, and a vertical overflow drain structure having a depletion layer associated therewith, the method comprising the steps of applying a pulse into said semiconductor substrate in order to widen said depletion layer in said semiconductor substrate, said pulse being impressed on said substrate exclusively during a time period when said charges are being transferred from said transferring means to said charge storage area.

2. The method of driving a solid-state imaging device as claimed in claim 1, wherein said photo-sensitive elements are photodiodes, said transferring means includes a plurality of CCD shift registers disposed adjacent to and along each of said lines of photodiodes and said charge storage area includes a plurality of CCD shift registers each being positioned to receive charges from corresponding CCD shift register of said transferring means.

3. A method of driving a solid-state imaging device formed in a semiconductor substrate and having an imaging area with a plurality of lines of photo-sensitive elements, a charge storage area for temporarily storing charges accumulated in and transferred from said imaging area, means for transferring said charges accumulated in said imaging area to said charge storage area, said transferring means operating as a first vertical CCD shift register for transferring said charges and said charge storage area operating as a second vertical CCD shift register for transferring charges therein, a horizontal CCD shift register coupled to receive charges in parallel from said charge storage area and to output said charges in serial, and a vertical overflow drain structure having a depletion layer associated therewith, the method comprising the steps of applying a pulse into said semiconductor substrate in order to widen said depletion layer in said semiconductor substrate, said pulse being impressed on said substrate at a time period when said charges are being transferred from said imaging area to said transferring means and at a time period when said charges are being transferred from said transferring means to said charge storage area.

4. The method of driving a solid state imaging device as claimed in claim 3, wherein said photo-sensitive elements are photodiodes, said transferring means includes a plurality of CCD shift registers disposed adjacent to and along each of said lines of photodiodes, and said charge storage area includes a plurality of CCD shift registers each being positioned to receive charges from corresponding CCD shift registers of said transferring means.

* * * * *